UNITED STATES PATENT OFFICE.

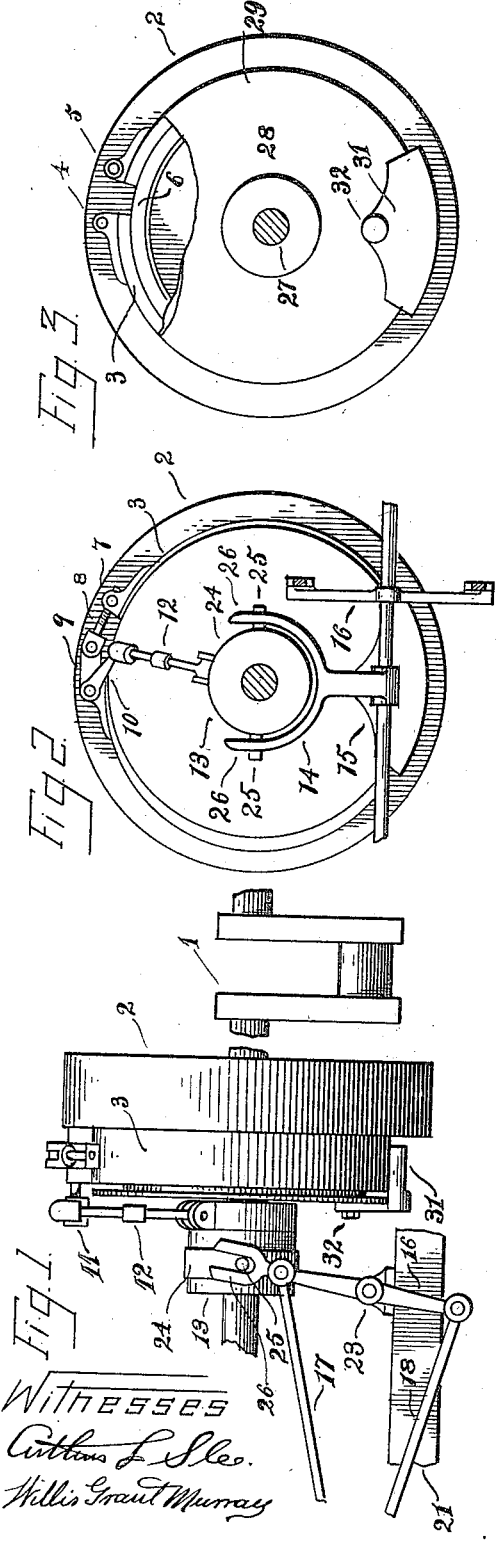

RAFORD W. PETERSON, OF SANTA ROSA, CALIFORNIA.

CLUTCH CONTROL.

1,069,808.  Specification of Letters Patent.  Patented Aug. 12, 1913.

Application filed July 5, 1912. Serial No. 707,880.

*To all whom it may concern:*

Be it known that I, RAFORD W. PETERSON, a citizen of the United States, residing at Santa Rosa, county of Sonoma, State of California, have invented certain new and useful Improvements in Clutch Control, of which the following is a specification.

My invention relates to clutch control, and particularly to the kind used in motor driven vehicles.

The object of my invention is to provide a cheap and simple means for controlling the transmission of power by clutches.

My invention is illustrated in the accompanying drawings, in which:—

Figure 1, is a side elevation of the clutch mechanism in contact. Fig. 2, is a front end view showing clutch open or out of contact. Fig. 3, is a front end view of clutch disk showing the driving bearing and having the upper part broken open to show the protecting flange and clutch band bearings. Fig. 4, is a front end view showing the clutch in contact or closed, and Fig. 5, is a side sectional view showing controlling bars with pedals mounted and clutch open or out of contact.

1 is a crank shaft with fly wheel 2 mounted.

3 is a clutch band with end bearings 4 and 5.

6 is a friction ring on the fly wheel 2.

7 is a movable anchorage and 8 is a yoke end adjustable bolt.

9 is a short lever.

10 is a rocker arm and 11 is the rocker arm shaft.

12 is an adjustable toggle with ball socket and eye.

13 is a sliding collar with groove.

14 is a yoke and 15 is a yoke shaft with double ended lever 16.

17 and 18 are controlling bars and 19 and 20 are the pedals.

21 is a section of the frame on which are mounted the pedal shaft bearing 22 and the yoke shaft bearing 23.

24 is a trunnion collar in the groove of the sliding collar 13.

25—25 are the trunnions and 26—26 are the trunnion slots in the yoke 14.

27 is the clutch shaft and 28 is the clutch disk with the protecting flange 29.

30 is the inside bearing.

31 is the driving bearing on the clutch band 3, and 32 is the driving pin.

The operation of my invention is as follows: The clutch band 3, is fitted concentric with the friction ring 6, on the fly wheel 2. On the ends of the clutch band are mounted the bearings 4 and 5, carrying in one a movable anchorage for the adjusting bolt 8, and in the other the rocker arm shaft to which is rigidly secured the short lever 9, and the rocker arm 10. One end of the toggle 12 is pivotally mounted on the sliding collar 13, while the other end is attached by means of a universal joint to the rocker arm 10. In the sliding collar referred to is a groove carrying the trunnion collar 24, and by means of the trunnions 25—25, operating in the slots 26—26, a sliding motion may be imparted to said collar carrying the toggle mechanism. The yoke in the ends of which are the slots 26—26, as well as the double ended lever 16, are rigidly mounted on the yoke shaft 15. This shaft in turn is movably mounted in suitable bearings on the frame 21. Connecting the above mentioned double ended lever with the pedals are the controlling bars 17 and 18, the said pedals being mounted on the frame 21, by the shaft and bearings 22. Beginning the operation with the clutch mechanism in the open position shown (Fig. 5) the operator presses the pedal 19 forward and by means of the controlling bar 17 the double ended lever 16 is moved forward, and as the yoke with its engaged trunnions is secured to the same shaft with said lever, the above described movement causes the sliding collar 13 to be moved to the clutch disk. This movement of the collar in turn causes the rocker arm to be raised by means of the toggle attached, and through the action of the short lever 9, and the adjustable bolt 8 the ends of the clutch band are drawn together thereby clamping securely the friction ring 6, on the fly wheel 2. As the clutch band 3 is now securely locked to the fly wheel by the action above described it will be seen that by means of the driving bearing 31 and the pin 32, the rotating motion of said fly wheel is conveyed to the clutch disk 28, which in turn is secured to the shaft 27 thus transmitting power under clutch control. It is obvious that if pressure is applied to the pedal 20, which has now changed position with pedal 19, a reverse motion will be applied to the clutch mechanism and the clutch band 3 opened thereby, releasing the friction ring 6 on the fly wheel, thus causing the transmission of power to cease, the same being under clutch control. To prevent the clutch band from leaving the friction ring the protecting flange 29 on the clutch disk is provided, and to prevent the clutch from loosening when in its closed position, the sliding collar 13 passes the center of bearing relative to the rocker arm 10 thereby locking the same in this position. It will be observed that in the operation of this clutch it would be impossible to close or lock it accidentally, which is a great factor of safety.

Having thus described my invention, what I claim as new and desire to secure by Letters Patent, is:—

In combination a driving and a driven shaft, a friction clutch for connecting said shafts, a slidable collar on one of said shafts having a link connection to the clutch for positively operating said clutch to connect and to disconnect said shafts, a yoke shaft having a yoke operatively connected with said collar, a pair of oppositely extending arms on said yoke shaft, a pair of pedal levers and links connecting said pedal levers respectively with said oppositely extending arms.

In testimony whereof, I affix my signature in presence of two witnesses.

RAFORD W. PETERSON.

Witnesses:
O. A. EGGERS,
WILLIS GRANT MURRAY.

---

Copies of this patent may be obtained for five cents each, by addressing the "Commissioner of Patents, Washington, D. C."